US012715043B2

(12) United States Patent
Ferrario

(10) Patent No.: US 12,715,043 B2
(45) Date of Patent: Aug. 25, 2026

(54) MULTI-LASER SYSTEM FOR ADDITIVE MANUFACTURING

(71) Applicant: Prima Additive S.R.L., Turin (IT)

(72) Inventor: Fabio Ferrario, Turin (IT)

(73) Assignee: Prima Additive S.R.L., Turin (IT)

( * ) Notice: Subject to any disclaimer, the term of this patent is extended or adjusted under 35 U.S.C. 154(b) by 448 days.

(21) Appl. No.: 18/284,927

(22) PCT Filed: Jun. 17, 2021

(86) PCT No.: PCT/EP2021/066368
§ 371 (c)(1),
(2) Date: Sep. 29, 2023

(87) PCT Pub. No.: WO2022/207128
PCT Pub. Date: Oct. 6, 2022

(65) Prior Publication Data

US 2024/0181535 A1 Jun. 6, 2024

(30) Foreign Application Priority Data

Mar. 31, 2021 (IT) ........................ 102021000008102

(51) Int. Cl.
*B22F 12/45* (2021.01)
*B22F 10/28* (2021.01)
*B22F 12/41* (2021.01)
*B22F 12/49* (2021.01)
*B22F 12/67* (2021.01)
*B22F 12/70* (2021.01)
(Continued)

(52) U.S. Cl.
CPC .............. *B22F 12/45* (2021.01); *B22F 10/28* (2021.01); *B22F 12/41* (2021.01); *B22F 12/49* (2021.01); *B22F 12/67* (2021.01); *B22F 12/70* (2021.01); *B33Y 10/00* (2014.12); *B33Y 30/00* (2014.12); *B22F 2998/10* (2013.01)

(58) Field of Classification Search
CPC .......... B22F 12/45; B22F 10/28; B22F 12/41; B22F 12/49; B22F 12/67; B22F 12/70; B22F 2998/10; B22F 10/322; B22F 12/80; B33Y 10/00; B33Y 30/00; Y02P 10/25
See application file for complete search history.

(56) References Cited

U.S. PATENT DOCUMENTS 9,931,789 B2 4/2018 Wiesner et al.
2018/0065303 A1 3/2018 Schade
(Continued)

FOREIGN PATENT DOCUMENTS

CN 111842886 A 10/2020
EP 3083254 A1 10/2016

*Primary Examiner* — Ricardo D Morales
(74) *Attorney, Agent, or Firm* — Whitestone Law, PLLC

(57) ABSTRACT

A multi-laser system for additive manufacturing can be used inside a working chamber in an environment with an atmosphere of an inert gas, consisting of multiple laser sources and a plurality of optical and/or optical systems scanning necessary to generate and convey the electromagnetic radiation beams within the predetermined processing sectors in which it is possible to remove the fumes and/or pollutants deriving from the selective powder melting process as close as possible to the melted layer or layer and introduce in the same chamber the process gases necessary for the processing of powder bed fusion or powder bed in a localized manner.

9 Claims, 7 Drawing Sheets

(51) Int. Cl.

| | |
|---|---|
| ***B33Y 10/00*** | (2015.01) |
| ***B33Y 30/00*** | (2015.01) |

(56) References Cited

U.S. PATENT DOCUMENTS

| | | | | |
|---|---|---|---|---|
| 2018/0326485 | A1* | 11/2018 | Brown .................... | B22F 12/44 |
| 2020/0147690 | A1 | 5/2020 | Tenhouten et al. | |

* cited by examiner 103
107
111
104
X+
102
105
106

MULTI-LASER SYSTEM FOR ADDITIVE MANUFACTURING

CROSS REFERENCE TO RELATED APPLICATIONS

This application is a national phase filing under 35 C.F.R. § 371 of and claims priority to PCT Patent Application No. PCT/EP2021/066368, filed on Jun. 17, 2021, which claims the priority benefit under 35 U.S.C. § 119 of Italian Application No. 102021000008102, filed on Mar. 31, 2021, the contents of which are hereby incorporated in their entireties by reference.

BACKGROUND

The present invention refers to a multi-laser system for additive manufacturing. In particular, a multi-laser system for additive manufacturing with powder bed fusion or powder bed technology is illustrated.

Additive manufacturing (AM) is a set of additive manufacturing processes starting from digital models, as opposed to traditional subtractive techniques (machining for chip removal, cutting and drilling); by means of a 3D CAD model that is divided into layers by a software integrated in the machine control system, or by on line services, a scheme of resulting layers is obtained that will be processed by the machine tool for the deposition process, or sintering, of different types of materials, in particular metals, plastics or composite components.

SUMMARY

The main feature of this technology is that it is a production process that allows the creation of components with geometry very close to that of the final component, as required by the project design. In the AM family, some different technologies can be identified, such as selective melting/sintering of a powder bed using a laser beam (Selective Laser Beam Melting—SLBM or Selective Laser Beam Sintering—SLBS or also known as Powder Bed Fusion or PBF), metal deposition through a laser beam (Laser Beam Metal Deposition—LBMD) and Selective Electron Beam Melting—SEBM.

In the powder bed or PBF technology, the laser beam is used as a heat source with a high power density, necessary to melt the metal powders only in certain zones or predetermined areas, in which compact material must be obtained for the construction of the three-dimensional component. The advantage linked to the use of a laser beam is that it can be focused on small dimensions or spots, typically of the order of 30 pm in diameter, and therefore guarantees high power densities that lead to a rapid melting of the powder and to a good level of precision, in terms of surface finish, of the part to be made. These features have allowed access to the industrial market of powder bed technology, for the production of components in different sectors, from aerospace to medical, from automotive to jewelry. In particular, compared to traditional production technologies, it is possible to achieve very high levels of component customization, given the great flexibility of the powder bed technology.

During the production process, between the melting of one layer and the next, there is a time interval that limits the productivity of the system, as it is necessary to wait for the doctor blade or the recoater to complete the drafting of a new bed of powder, before starting the subsequent processing.

The manufacturing process depends mainly on the radiation-matter interaction or on the absorption properties of the materials of the energy of electromagnetic radiation and on the temperature of the powder bed; in particular, the absorption properties of a material include parameters such as density, thermal conductivity, specific heat and emissivity, and vary according to the temperature of the material itself, which in the additive manufacturing technology in powder bed or powder bed fusion, determines the processing process of the material.

The choice of process parameters, such as laser power, laser scanning speed on the powder bed, shape of the laser beam and used material influence the structural and surface quality of the components produced and the productivity of the system, which becomes decisive for the use of this type of machinery in the industrial field, especially in sectors today covered by foundry and/or hot molding and/or die casting thanks also to the advantages such as high spatial resolution, capillary process control and the ability to carry out a pre-processing of the powder bed and post processing of the freshly melted material.

The melting process takes place by means of one or more laser sources inside a working chamber with the aid of a plurality of optical and/or scanning systems and in an environment with an atmosphere of an inert gas (for example nitrogen, argon, etc.), inside which there are some handling devices that allow controlling the adduction of the powder, and therefore guaranteeing the realization of the component, the aspiration of fumes deriving from the selective melting process and the injection of gas to support the production process.

Many multi-laser systems for additive manufacturing are known in the art, such as disclosed in EP-A1-3083254 relating to a system consisting of a set of lasers suitable for scanning the work area for the 3D production of an object, or in CN-A-112248436 relating to a system with a plurality of lasers in which the number of scans carried out on the object under construction is reduced to improve the quality of the forming, or in CN-A-111842886 relating to a system for powder bed technology in which there are multiple scanning systems of the laser beam and of the blowing and suction systems between the work area and the laser beam transmission systems, or in CN-A-209063559 which describes a system with 4 galvanometers and includes two air intake inlets, two outlet outlets air and a filtering system, in which the two exhaust inlets are respectively positioned at the lower ends of the left and right side plates of the chamber, and again in EP-A1-3050648 relating to a system of inlet and suction of gas on the work area, with the inflow nozzle and the outlet nozzle arranged in such a way as to create a gas flow that passes at least partially above the work and junction area.

The main disadvantage of the known art concerns systems in which the devices with multiple lasers are not able to operate autonomously on a certain sector of the work surface or even while using a plurality of laser sources, the number of scans is reduced to the disadvantage of the production speed, and again, the extraction of process fumes and the introduction of support gases is not localized, but limited to the boundary walls of the work chamber or to structures that can introduce uncontrollable vibrations into the dust bed, as well as not to be localized close to the processes carried out in the layers of powder by the lasers used, a limit that introduces the formation of defects and/or inclusions within the molten material and therefore in the final components of small and/or large dimensions. Furthermore, these are devices that are not easily scalable as regards the laser sources, in particular as regards the localized processing of the layers in the powder bed.

Object of the present invention is solving the aforementioned prior art problems by means of a multi-laser system for additive manufacturing, through a scalable system that allows the use of multiple laser sources that generate electromagnetic radiation beams located along the sectors of pre-established processing, able to operate autonomously on each sector of competence, guaranteeing a high quality of the object to be created combined with a high production rate. Another object is using a mechanical system free from possible uncontrollable vibrations in the powder bed through the use of a fixed system above the work area, which, during the passage of the doctor blade, moves completely along the right/left with respect to the work area: this ensures that the layers deposited in the work surface do not undergo variations and/or turbulence with respect to the drafting of subsequent layers.

The aforesaid and other objects and advantages of the invention, as will emerge from the following description, are achieved with a multi-laser system for additive manufacturing such as the one described in claim 1. Preferred embodiments and non-trivial variants of the present invention form the object of dependent claims.

It is understood that all attached claims form an integral part of the present description.

It will be immediately obvious that innumerable variations and modifications (for example relating to shape, dimensions, arrangements and parts with equivalent functionality) can be made to what is described, without departing from the scope of the invention as appears from the attached claims.

BRIEF DESCRIPTION OF THE DRAWINGS

The present invention will be better described by some preferred embodiments, provided by way of non-limiting example, with reference to the attached drawings, in which.

DETAILED DESCRIPTION

Figure 1:
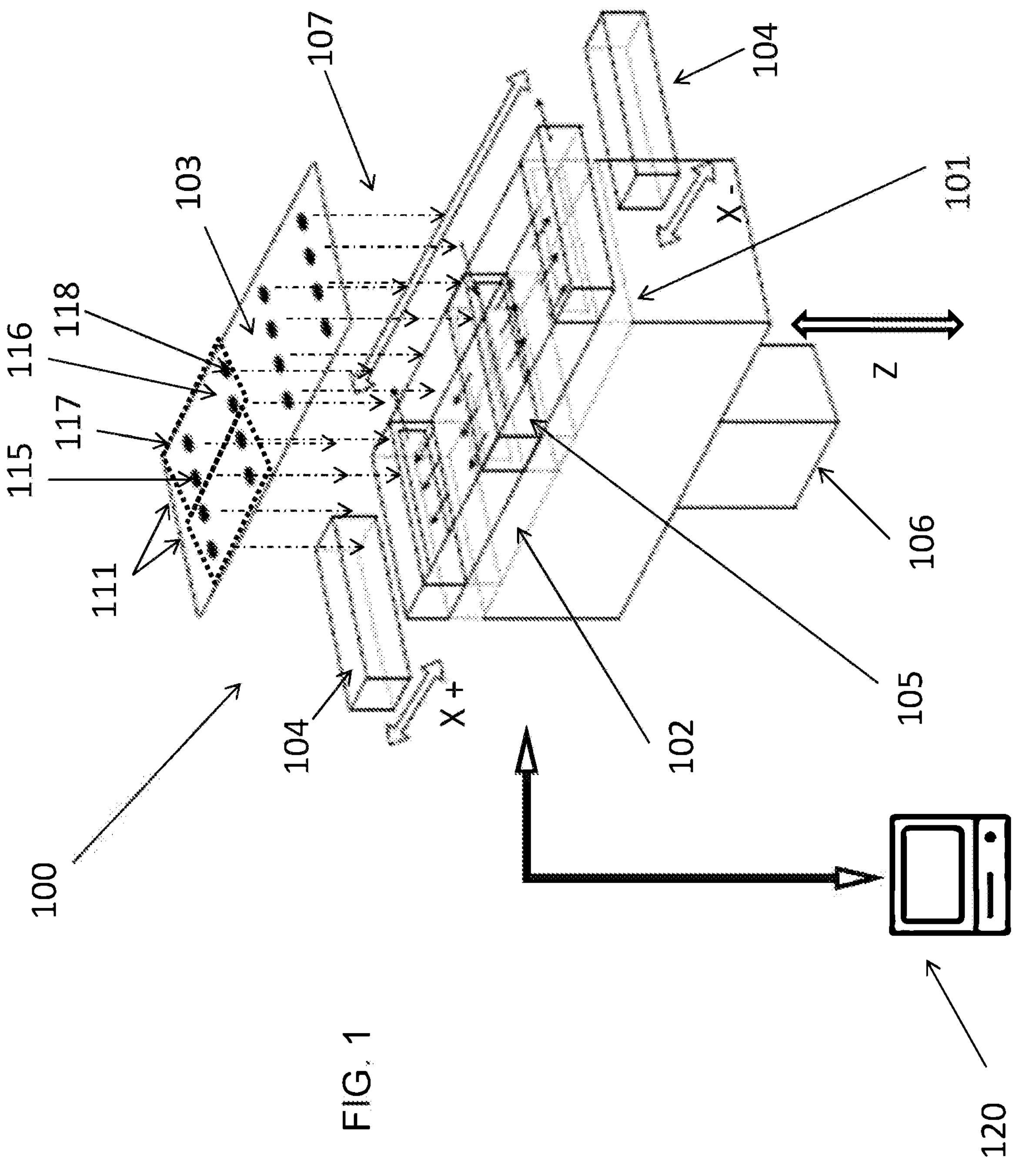
FIG. 1 shows the multi-laser system for additive manufacturing (100) according to the present invention.

The multi-laser system (100) for additive manufacturing is designed to be used inside a working chamber in an environment with an atmosphere of an inert gas (for example nitrogen, argon, etc.) and is made up of multiple laser sources and a plurality of optical and/or scanning systems necessary to generate and convey the electromagnetic radiation beams within the predetermined processing sectors in which it is possible to remove the fumes and/or pollutants deriving from the selective powder melting process as close as possible to the melted layer or layer as well as introducing in the same chamber the process gases necessary for the processing of powder bed fusion or powder bed in a localized manner, said multi-laser system (100) being scalable and able to operate autonomously on each sector of expertise guaranteeing a high quality of the object to be made combined with a high production rate; it consists of a matrix of independent optical systems (103) designed to convey the electromagnetic radiation beams (107) in a predetermined area of a work surface (101), called matrix of independent optical systems (103) capable of by superimposing said electromagnetic radiation beams (107) 100% in said predetermined area of a work plane (101), said matrix of independent optical systems (103) being connected to the upper surface of a machine tool, and a work plane (101) designed to house a bed of powder (102), operationally connected to a piston (106), as can be seen from FIG. 1.

Advantageously, as can be seen from FIG. 1, said matrix of independent optical systems (103) is scalable and modular in multiple modules (111) of laser and optical and/or galvanometric scanning systems; in particular said modules (111) can be constituted by at least 4 laser and optical and/or galvanometric scanning systems and said modules (111) can be increased according to the production volumes, the dimensions of the pieces to be made and the process speed in multiples of 4 units, corresponding to the work area necessary to implement the additive manufacturing process.

Figure 2:
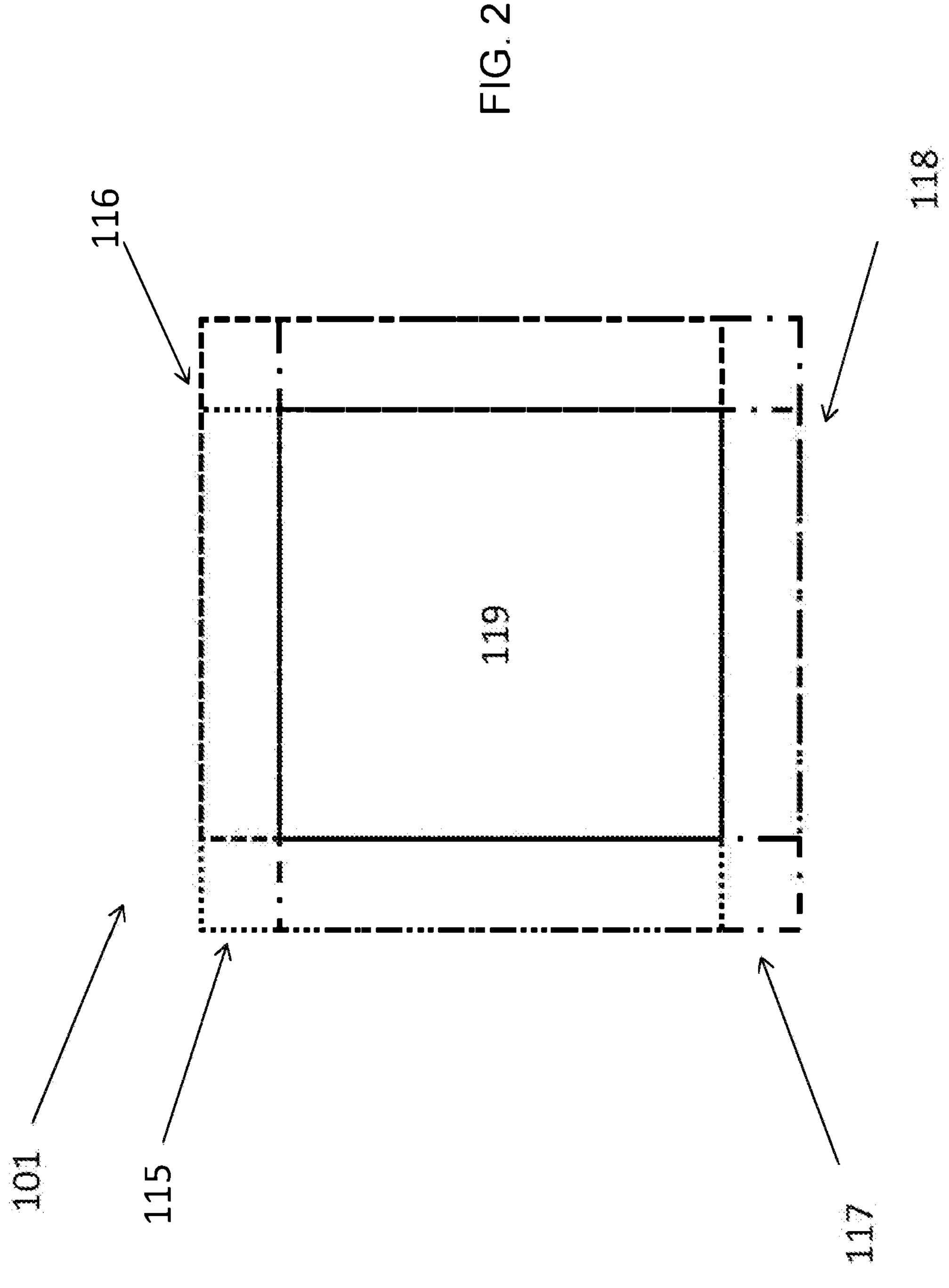
FIG. 2 shows a diagram of the overlapping areas of the multi-laser system for additive manufacturing (100) according to the present invention.
Figure 3:
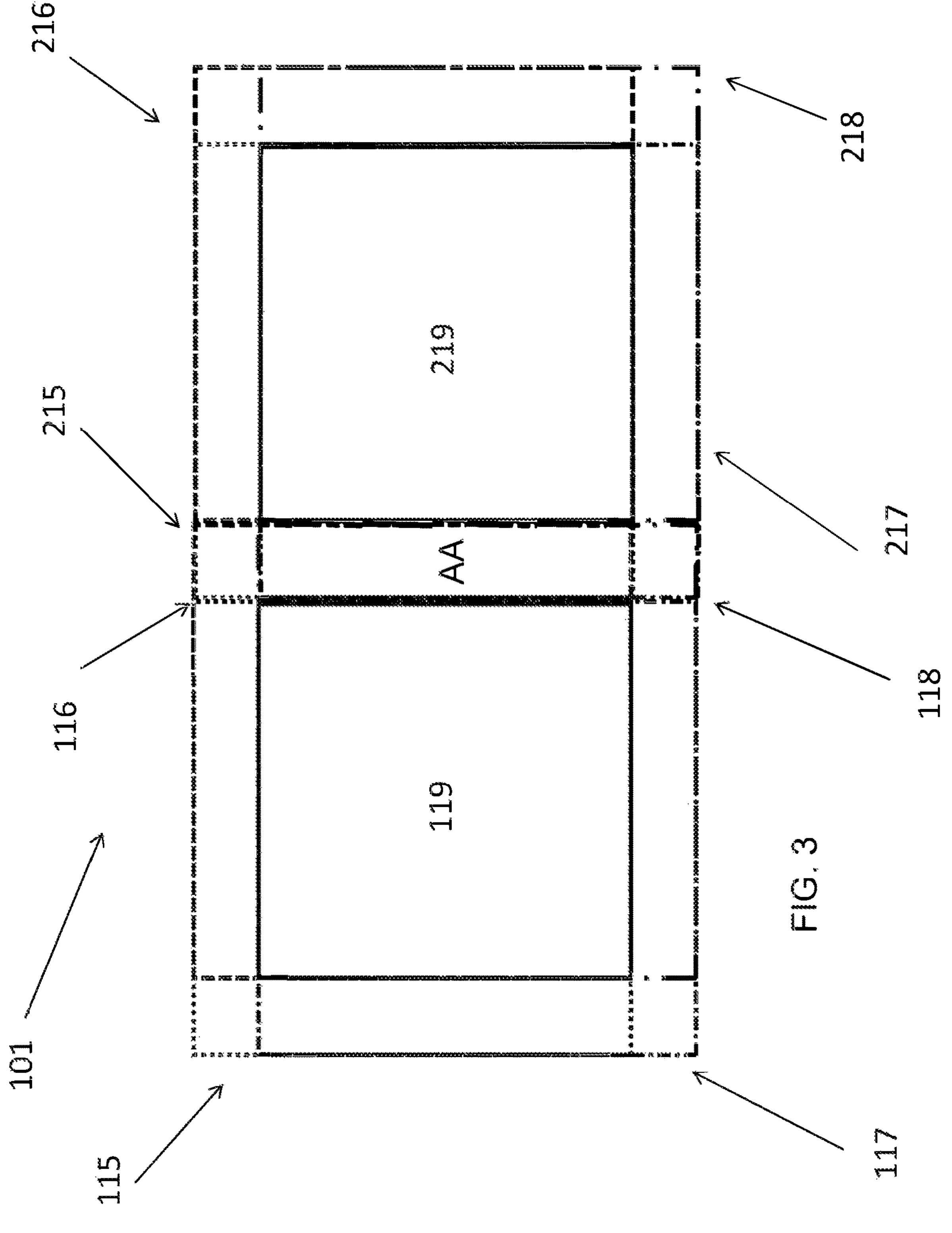
FIG. 3 shows a diagram of the contiguous overlapping areas of the multi-laser system for additive manufacturing (100) according to the present invention.
Figure 4:
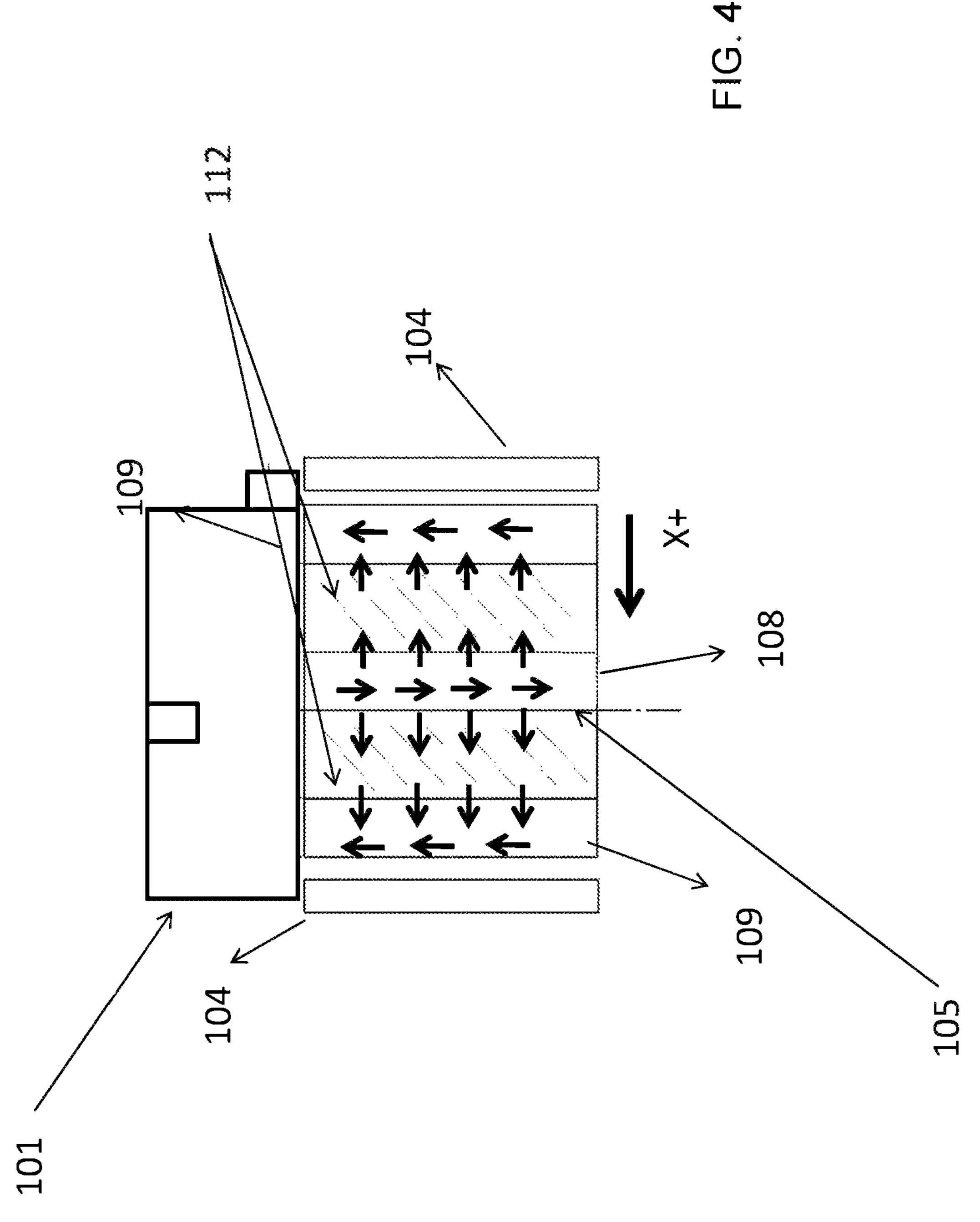
FIG. 4 shows a top view of the laser trajectories in the corresponding work areas of the multi-laser system for additive manufacturing (100) according to the present invention.

Furthermore, said modules (111) of laser and optical and/or galvanometric scanning systems are able to operate autonomously and to carry out additive manufacturing processes within each working sector (112); in particular, each laser source emits a beam of electromagnetic radiation (107) capable of carrying out additive manufacturing processes in the corresponding area (119) in each working sector (112) with a total overlap of 100%, and in the corresponding areas (115), (116), (117) and (118) in each working sector (112) with a partial overlap of 50%, i.e. where two laser sources work as shown in FIGS. 2 and 3.

The superposition of two laser sources, as shown in FIG. 3, is therefore able to cover 100% the entire peripheral area with the aid of two of the laser sources of said module (111), since in the areas (115), (116), (117) and (118) two laser sources of a first module (111) work together with two of the laser sources of a second module (111) able to perform 100% machining in the area (219) and at the 50% in areas (215), (216), (217) and (218): therefore, as can be seen from FIG. 3, in the area indicated as AA given by the union of areas (215) and (118), 4 laser sources work and each of said areas (215) and (118) is covered by the laser sources of two contiguous modules (111). This management of the overlapping areas ensures that the optical and/or galvanometric scanning systems are closer to the work area, allowing additive manufacturing operations to be carried out using smaller spot diameters of said electromagnetic radiation beams (107), with advantages on the final component produced such as for example greater surface finish, better precision of the final surface, lower probability of inclusion of manufacturing defects and so on.

Figure 5:
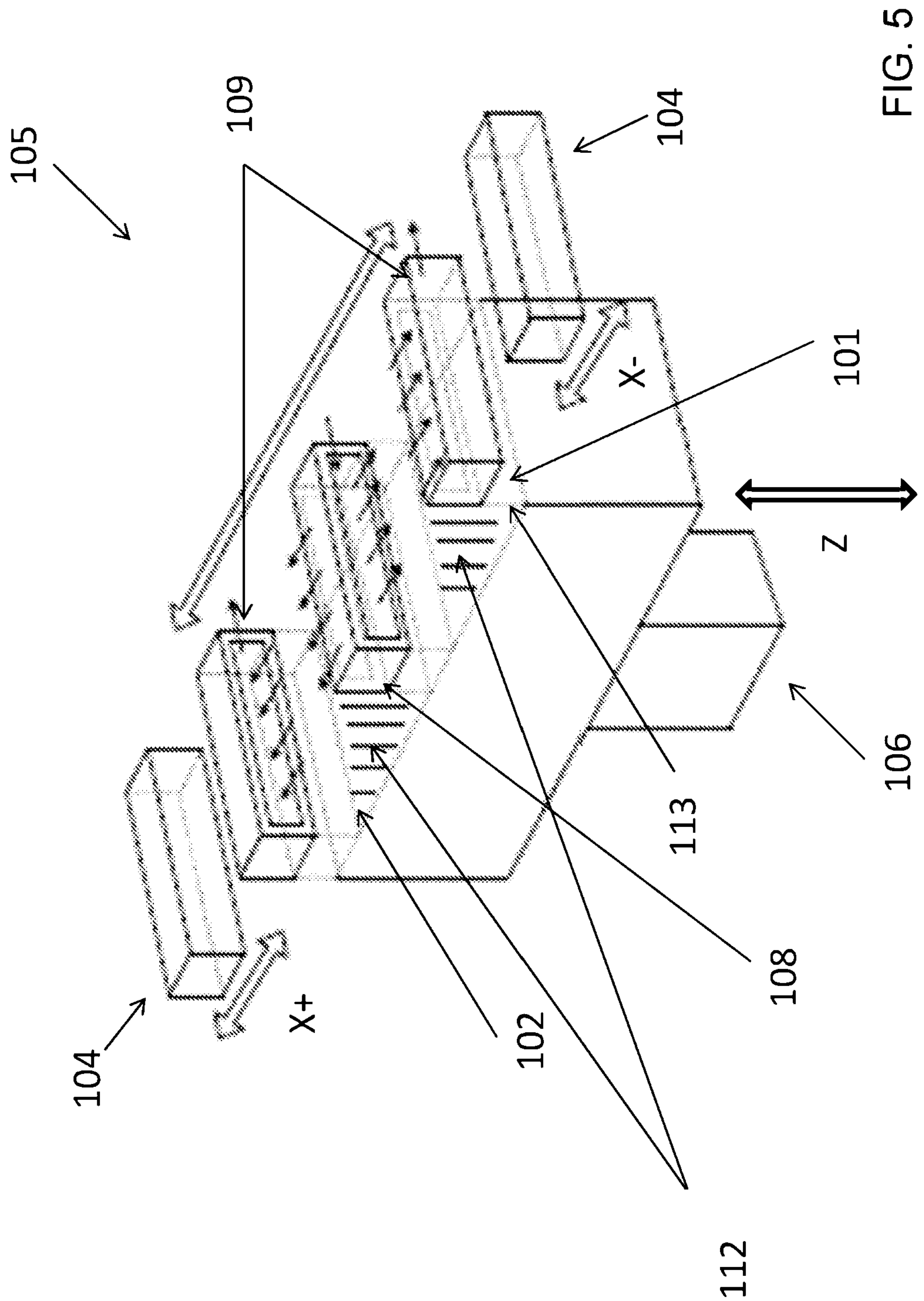
FIG. 5 shows the gas suction and inlet system (105), in the translation phase in direction (X+) according to the present invention.
Figure 6:
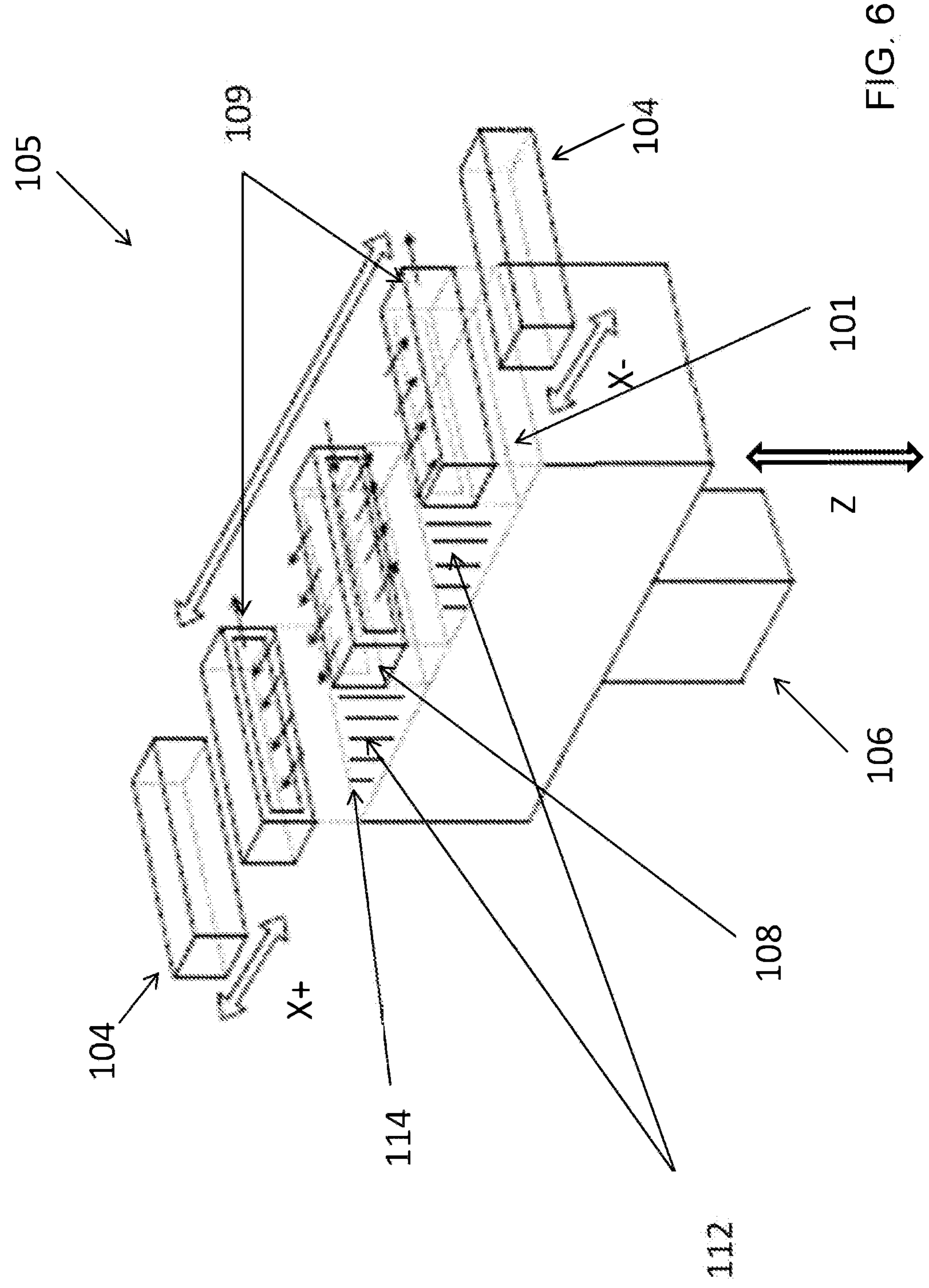
FIG. 6 shows the gas intake and inlet system (105), in the translation phase in direction (X−), according to the present invention.
Figure 7:
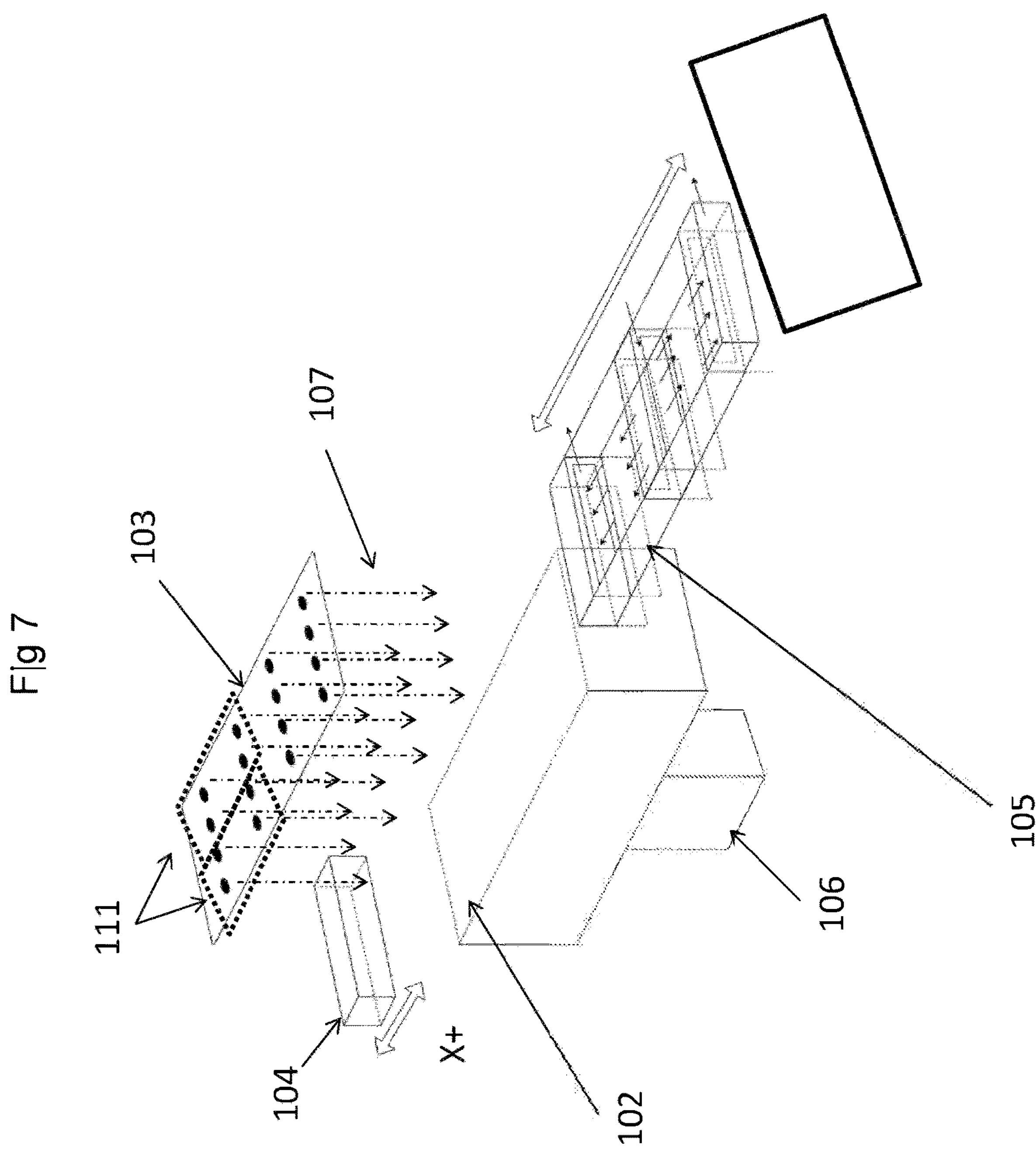
FIG. 7 shows the gas suction and inlet system (105) outside the work surface, according to the present invention.

The multi-laser system (100) for additive manufacturing of the invention is equipped with a fume extraction and support gas input system (105) which delimits said work sectors (112) by means of a diffusive central element (108), suitable for introducing the process gas in certain processing sectors (112), and with two suction side elements (109), designed to remove the fumes deriving from the process from the sectors (112), said central diffusive element (108) and said suction side elements (109) able to move transversely with respect to said work plane (101) and operatively connected to said work plane (101), as can be seen from FIGS. 5, 6 and 7.

In particular, said fume extraction and support gas input system (105) is able to guarantee the maximum laminar performance of the flows, in order to produce objects free of residual stress, internal defects and inclusions in the layers or layers, such as porosity or structural interruptions in the area of the welded surface, which contribute to compromising the structural integrity and performance of the final component, through a translation system along the X axis with the aid of electromechanical actuators, designed to expose the work sectors (113) and (114) to said electromagnetic radiation (107) of the corresponding module (111), and thus allow to complete the additive manufacturing processes in said work sectors (113) and (114), said fume extraction and support gas input system (105) capable of locally introducing the gases necessary for the process into said work surface (101), and locally aspirating the process fumes from said work surface (101).

The translation process can be performed in combined action with a doctor blade or recoater (104) positioned in one of the ends of the work surface (101) and equipped with optical or capacitive proximity sensors necessary to control the relative movement between said doctor blade (104) and said system for aspirating the fumes and for introducing the support gases (105); these movements are managed by a control unit (120) operationally connected to the machine tool.

Advantageously, the fumes suction and support gas input system (105) is designed to translate in the X direction towards the end part from the work surface (101) and in the opposite direction to said doctor blade (104) to allow the passage of said doctor blade (104) in said work surface (101) and allow said doctor blade (101) to spread the powder, as can be seen from FIG. 7.

Furthermore, said system for the aspiration of the fumes and the introduction of the support gases (105) is designed to translate in the X direction towards the end part of the work surface (101) and in the opposite direction to a doctor blade (104) to allow the passage of said doctor blade (104) in said work surface (101) and allow said doctor blade (101) to spread the powder.

The multi-laser system (100) for additive manufacturing is designed to be versatile according to production needs and includes the following phases:

- directing the doctor blade (104) along the work surface (101) in the X direction for the spreading of the powder bed (102) beyond the edge of said work surface (101);
- positioning the gas suction and inlet system (105) above the powder bed (102) in said work surface (101);
- arranging the switching on of the laser sources and of the independent optical systems (103) or separately of the modules (111) and direct the laser beams (107) in the work sectors (112) placed between the central diffusive element (108) and the two suction side elements (109);
- translating the gas intake and inlet system (105) over the powder bed (102) along the X axis to expose the work sectors (113) and (114) to electromagnetic radiation (107) for additive manufacturing applications;
- translating the gas suction and inlet system (105) in the X direction towards the end part of said work surface (101) and in the opposite direction to the doctor blade (104) and moving the piston (106) in the Z direction downwards;
- turning off the laser sources during the passage of the doctor blade (104) for spreading the powder in said work surface (101);
- positioning the gas intake and inlet system (105) on said work surface (101) and activating the laser sources.

The invention claimed is:

1. A Multi-laser system for additive manufacturing comprising:

- a matrix of independent optical systems designed to convey the electromagnetic radiation beams in a predetermined area of a work surface, the matrix of independent optical systems capable of superimposing at 100% the electromagnetic radiation beams in the predetermined area of a work surface, the matrix of independent optical systems being connected to the upper surface of a machine tool;
- a work surface, designed to house a powder bed, operatively connected to a piston; and
- wherein a system for the aspiration of fumes and introduction of support gases is provided with a diffusive central element suitable for process gas in work sectors and two suction side elements designed to remove the fumes deriving from the process from the work sectors, the central diffusive element and the suction side elements operationally connected to a work plan.

2. The Multi-laser system for additive manufacturing according to claim 1, wherein the matrix of independent optical systems is scalable and modular in multiple modules of laser and optical and/or galvanometric scanning systems in correspondence with the work area necessary to implement the additive manufacturing process.

3. The Multi-laser system for additive manufacturing according to claim 1, wherein the autonomous modules are designed with at least 4 lasers, each of which emits a beam of electromagnetic radiation capable of performing additive manufacturing in the corresponding areas in each work sector with a total overlap of 100%.

4. The Multi-laser system for additive manufacturing according to claim 1, wherein the autonomous modules are designed with at least 4 lasers, each of which emits a beam of electromagnetic radiation capable of performing additive manufacturing in the corresponding areas in each work sector with a partial overlap of 50%.

5. The Multi-laser system for additive manufacturing according to claim 1, wherein the work sectors are delimited by a system for the extraction of fumes and for the introduction of the support gases necessary to locally remove process fumes from the work area and for introducing process assistance gases, the system for the extraction of fumes and for the introduction of support gases operatively connected to the work surface.

6. A Multi-laser system for additive manufacturing comprising:

- a matrix of independent optical systems designed to convey the electromagnetic radiation beams in a predetermined area of a work surface, the matrix of independent optical systems capable of superimposing at 100% the electromagnetic radiation beams in the predetermined area of a work surface, the matrix of independent optical systems being connected to the upper surface of a machine tool;

a work surface, designed to house a powder bed, operatively connected to a piston; and wherein a system for the aspiration of the fumes and the introduction of support gases is designed to perform a translation movement along the axis X necessary to expose the work sectors to electromagnetic radiation for additive manufacturing applications.

7. A Multi-laser system for additive manufacturing comprising:

a matrix of independent optical systems designed to convey the electromagnetic radiation beams in a predetermined area of a work surface, the matrix of independent optical systems capable of superimposing at 100% the electromagnetic radiation beams in the predetermined area of a work surface, the matrix of independent optical systems being connected to the upper surface of a machine tool;

a work surface, designed to house a powder bed, operatively connected to a piston; and wherein a system for the aspiration of the fumes and the introduction of the support gases is designed to translate in an X direction towards the end part from the work surface and in the opposite direction to a doctor blade to allow the passage of the doctor blade in the work surface and allow the doctor blade to spread the powder.

8. The Multi-laser system for additive manufacturing according to claim 1, wherein the system for the aspiration of the fumes and for the introduction of the support gases is capable of locally introducing the gases necessary for the process in the plane work, and to locally extract the process fumes from the work surface.

9. An Additive manufacturing method performed using the multi-laser for additive manufacturing according to claim 7, the method comprising:

directing the doctor blade along the work surface in the X direction for the spreading of the powder bed beyond the edge of the work surface;

positioning the gas suction and inlet system above the powder bed in the work surface;

arranging the switching on of the laser sources and of the independent optical systems or separately of the modules and direct the laser beams in the work sectors placed between the central diffusive element and the two suction side elements;

translating the gas intake and inlet system over the powder bed along the X axis to expose the work sectors to electromagnetic radiation for additive manufacturing applications;

translating the gas suction and inlet system in the X direction towards the end part of the work surface and in the opposite direction to the doctor blade and moving the piston in the Z direction downwards;

turning off the laser sources during the passage of the doctor blade for spreading the powder in the work surface;

positioning the gas intake and inlet system on the work surface and activating the laser sources.

* * * * *